US009848021B2

(12) United States Patent
Baer et al.

(10) Patent No.: US 9,848,021 B2
(45) Date of Patent: Dec. 19, 2017

(54) SESSION PERSISTENT DATA AND METHOD OF USE THEREOF

(75) Inventors: Anders Baer, Årsta (SE); David Khan, Bromma (SE)

(73) Assignee: TELEFONAKTIEBOLAGET LM ERICCSON (PUBL), Stockholm (SE)

( * ) Notice: Subject to any disclaimer, the term of this patent is extended or adjusted under 35 U.S.C. 154(b) by 212 days.

(21) Appl. No.: 14/377,244

(22) PCT Filed: Feb. 7, 2012

(86) PCT No.: PCT/EP2012/052005
§ 371 (c)(1),
(2), (4) Date: Aug. 7, 2014

(87) PCT Pub. No.: WO2013/117215
PCT Pub. Date: Aug. 15, 2013

(65) Prior Publication Data
US 2015/0019747 A1    Jan. 15, 2015

(51) Int. Cl.
*G06F 15/16* (2006.01)
*H04L 29/06* (2006.01)

(52) U.S. Cl.
CPC ...... *H04L 65/1069* (2013.01); *H04L 65/1006* (2013.01); *H04L 65/1016* (2013.01); *H04L 65/1053* (2013.01)

(58) Field of Classification Search
CPC .............. H04L 65/1069; H04L 65/1006; H04L 65/1016; H04L 65/1053
USPC ........ 709/223, 224, 203, 208, 228; 370/352, 370/400
See application file for complete search history.

(56) References Cited

U.S. PATENT DOCUMENTS

| 8,880,068 | B2 * | 11/2014 | Lindgren | 370/352 |
| 9,736,192 | B2 * | 8/2017 | Noldus | H04L 65/104 |
| 2006/0052087 | A1 * | 3/2006 | Tuunanen | H04L 12/58 455/414.1 |

(Continued)

FOREIGN PATENT DOCUMENTS

GB    2468964 A    9/2010

OTHER PUBLICATIONS

Barnes et al. "Session Initiation Protocol (SIP) History-Info Header Call Flow Examples; draft-barnes-sipcore-rfc4244bis-callflows-oo. txt", Network Working Group, Internet Engineering Task Force, IETF; 2010, 26 pages.

(Continued)

*Primary Examiner* — Thu Ha Nguyen
(74) *Attorney, Agent, or Firm* — Rothwell, Figg, Ernst & Manbeck, P.C.

(57) ABSTRACT

A method of and apparatus for generating, storing and transmitting information relating to a session between an endpoint in an enterprise and an endpoint remote from the enterprise to enable the remote endpoint to contact the enterprise endpoint in a subsequent communications session. The information generated includes, at least, a session identifier identifying the session and the identity of the enterprise endpoint. Advantageously the remote endpoint is also provided with the enterprise communication identity or other means to enable the remote endpoint to associate the session identifier with the enterprise's communication identity.

20 Claims, 4 Drawing Sheets

(56) References Cited

U.S. PATENT DOCUMENTS

| | | | |
|---|---|---|---|
| 2006/0077965 A1* | 4/2006 | Garcia-Martin | H04M 3/42195 370/352 |
| 2006/0291412 A1* | 12/2006 | Naqvi | H04M 7/123 370/328 |
| 2007/0195805 A1* | 8/2007 | Lindgren | H04L 65/1016 370/401 |
| 2008/0120697 A1* | 5/2008 | Beyer | H04L 63/0869 726/4 |
| 2008/0256224 A1* | 10/2008 | Kaji | H04L 65/1046 709/223 |
| 2009/0067439 A1* | 3/2009 | Yamamoto | H04L 63/061 370/400 |
| 2009/0088129 A1* | 4/2009 | Cai | H04L 12/1403 455/406 |
| 2009/0103524 A1* | 4/2009 | Mantripragada | H04L 65/1079 370/352 |
| 2009/0175215 A1* | 7/2009 | Chen | H04W 76/022 370/328 |
| 2009/0180463 A1* | 7/2009 | Yang | H04W 76/041 370/349 |
| 2009/0293123 A1* | 11/2009 | Jackson | H04L 63/1458 726/23 |
| 2009/0296689 A1* | 12/2009 | Bakker | H04L 65/40 370/352 |
| 2010/0005517 A1* | 1/2010 | Foti | H04N 21/25875 726/6 |
| 2010/0172345 A1* | 7/2010 | Bjorsell | H04M 7/006 370/352 |
| 2010/0246570 A1* | 9/2010 | Chavez | H04L 65/1006 370/352 |
| 2011/0032931 A1* | 2/2011 | Zhu | H04W 76/027 370/357 |
| 2011/0107379 A1* | 5/2011 | Lajoie | H04L 65/1016 725/87 |
| 2011/0170455 A1* | 7/2011 | Cai | H04L 12/1403 370/259 |
| 2011/0255531 A1* | 10/2011 | Noldus | H04L 29/12188 370/352 |
| 2012/0002548 A1* | 1/2012 | Walstrom | H04L 65/1016 370/235 |
| 2012/0124222 A1* | 5/2012 | Noldus | H04L 61/3085 709/227 |
| 2012/0184244 A1* | 7/2012 | Cai | H04L 12/14 455/408 |
| 2012/0239771 A1* | 9/2012 | Rasanen | H04L 65/1016 709/206 |
| 2013/0151586 A1* | 6/2013 | Morishige | H04L 65/1006 709/203 |
| 2013/0315079 A1* | 11/2013 | Edge | H04W 4/02 370/252 |
| 2013/0315230 A1* | 11/2013 | Li | H04L 12/14 370/352 |
| 2014/0092721 A1* | 4/2014 | Pankajakshan | H04W 76/028 370/216 |
| 2014/0133455 A1* | 5/2014 | Hallenstal | H04L 65/1016 370/331 |
| 2015/0350075 A1* | 12/2015 | Li | H04L 45/18 709/224 |
| 2016/0021007 A1* | 1/2016 | Shuman | H04L 47/12 370/235 |
| 2016/0100435 A1* | 4/2016 | Bakker | H04M 3/42348 455/404.1 |
| 2016/0150455 A1* | 5/2016 | Suryavanshi | H04W 36/245 455/436 |
| 2016/0248677 A1* | 8/2016 | Minakuchi | H04L 47/122 |
| 2016/0249401 A1* | 8/2016 | Tanaka | H04M 3/00 |

OTHER PUBLICATIONS

Dawkins, "SIP-PBX/Service Provider Interoperability" SIPconnect SIP FORUM Document No. TWG-2, 2011, 45 pages.

SIPconnect, "The SIPconnect Technical Recommendation: An Industry-Accepted Approach to Direct IP Peering for IP PBX and VoIP Service Provider Communications" 2006, 14 pages.

* cited by examiner

SESSION PERSISTENT DATA AND METHOD OF USE THEREOF

CROSS REFERENCE TO RELATED APPLICATION(S)

This application is a 35 U.S.C. §371 National Phase Entry Application from PCT/EP2012/052005, filed Feb. 7, 2012, designating the United States, the disclosure of which is incorporated herein in its entirety by reference.

TECHNICAL FIELD

The present invention provides a method of and apparatus for generating, storing and transmitting information relating to a session between an endpoint in an enterprise and an endpoint remote from the enterprise. The invention is of particular use in, but not limited to, enterprise networks using an IP Multimedia service to control access outside the enterprise

BACKGROUND

IP Multimedia (IPMM) services provide a combination of voice, video, messaging, data, etc, within the same session. As the number of basic applications and the media which it is possible to combine increases, the number of services offered to the end users will grow, and the potential for enriching inter-personal communication experience will be improved. This leads to a new generation of personalised, rich multimedia communication services, including so-called "combinational IP Multimedia" services.

IMS is the technology defined by the Third Generation Partnership Project (3GPP) to provide IP Multimedia services over mobile communication networks. IMS provides features to enhance the end-user person-to-person communication experience through the integration and interaction of services. IMS allows enhanced person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP) carried by SIP signalling is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

The proliferation of IP telephony systems has meant that Enterprises, such as call centres, more commonly use these systems along with connections to IMS. An example of a network including a connection to an enterprise is illustrated in FIG. 1. As can be seen the enterprise system 10 is provided with one or more enterprise endpoints 12 and an exchange 14. The enterprise endpoints 12 may be any suitable endpoint, for example, a telephone or a computer. The enterprise endpoints 12 connect to external networks 16 through an exchange 14. Other endpoints remote from the enterprise, remote endpoints 18, are also connected to the network 16, either directly or indirectly.

A remote endpoint is considered to be any endpoint which is not part of the enterprise system 10 and may be any type of endpoint. For example, a remote endpoint may be a mobile telephone as illustrated in FIG. 2. The remote endpoint 18 preferably includes at least, an input (aerial 20), an integral or external memory 22 and a processor 24. Other examples of remote endpoints are an IP telephone, a PSTN phone, a computer or any other endpoint capable of voice communication.

Communications between an enterprise endpoint and remote endpoints are directed through the exchange. This allows the Enterprise to run a private network.

In Enterprises it is common for a user to be routed through a number of menus in order to reach the enterprise endpoint belonging to the department or person they wish to contact. For example, a user contacting a call centre may be asked to press 1 to be transferred to Technical Support, 2 to be transferred to the Sales Department, 3 to be transferred to the Billing Department and so on. As the user calling into the Enterprise is only aware of the contact identity for the Enterprise and not the enterprise endpoint these menus must be passed through every time a user wishes to contact a particular department even if the reason for the contact is to follow up on a previous call. Additionally, as there is no record of any previous calls to the Enterprise any follow up calls may not be routed to the same person in the department. This can result in a user having to explain their situation multiple times meaning that there is no continuity of service.

Further, a call from inside an Enterprise to a user endpoint outside the Enterprise often results in the Enterprise number being displayed at the user endpoint. In such a situation the receiving user cannot call the originating user endpoint back without extensive instructions from the originating user as the number of the calling user endpoint is unknown.

SUMMARY

In accordance with a first aspect of the present invention there is provided a method, in a communications network including an enterprise endpoint and a remote endpoint. Session information including at least a unique session identifier for the communications session and the identity of the enterprise endpoint is generated and stored. The remote endpoint sends a request for a communications session including the session identifier. The session identifier in the session request can be used to retrieve the identity of the enterprise endpoint in order that a further communications session between the remote endpoint and the enterprise endpoint can be set up using the identity of the enterprise endpoint in the session information.

The method may include the step of transmitting the session identifier for the communications session to the remote endpoint.

Preferably, the remote endpoint associates the session identifier with a communication identity for the enterprise including the enterprise endpoint. This enables the remote endpoint to automatically include the session identifier in any request for a session sent to the enterprise.

The session information may also include context information. The remote endpoint includes stores the context information and includes a display to display the context information when the enterprise's communication identity is selected at the remote endpoint. This allows the remote endpoint to select whether to initiate a new session in preference to initiating a follow-up session and/or choose to follow-up a particular session where the user has had multiple reasons to contact the enterprise.

The session information may be transmitted to the remote endpoint as an IP based SMS. In this instance it is preferable that the enterprise communication identity is present in a reply to field and the body of the text includes context information.

The remote endpoint may transmit the session information as part of a SIP INVITE request.

The session information may include context information which includes information on the content of the session and/or a lifetime value which sets a time period after which the session information is deleted from the remote endpoint.

The session information may be transmitted in the header of a SIP message.

Session information may be generated in response to a communications session being successfully set up or terminated between the enterprise endpoint and the remote endpoint.

The apparatus may be a node in an IP telephony network, a node in an IP Multimedia Subsystem or an enterprise gateway.

In accordance with a second aspect of the present invention there is provided apparatus in an IP network. The apparatus stores, for a communications session between an enterprise endpoint and a remote endpoint, session information including at least a unique session identifier for the communications session and the identity of the enterprise endpoint. Upon receiving a session request from the remote endpoint including the session identifier the apparatus retrieves the identity of the enterprise endpoint using the session identifier in the session request. The apparatus can then set up a communications session between the remote endpoint and the enterprise endpoint using the identity of the enterprise endpoint stored in the session information.

The apparatus may include an output to transmit at least the unique identifier to the remote endpoint. The session information may be sent to the remote endpoint using an IP based SMS. The apparatus may be configured to insert the session information into the header of a SIP message.

The session request received by the apparatus may be a SIP INVITE request sent to the enterprise communication identity.

The session information generated by the apparatus may also include context information and/or a lifetime value.

The apparatus may generate and/or store the session information when a communications session is successfully set up or terminated between a remote endpoint and an enterprise endpoint.

In accordance with another aspect of the present invention there is provided a user endpoint. The user endpoint includes an input to receive a message including session information of at least an identifier for a communications session between the user endpoint and an enterprise endpoint. A processor in the user endpoint associates the session information with a communication identity for the enterprise. The user endpoint also includes memory to store, for the communications session, at least the identifier for the communications session in association with a number for the enterprise of the enterprise endpoint.

The session information sent to the user endpoint preferably includes a communication identity of the enterprise to enable user endpoint to readily associate the session information with the communication identity of the enterprise stored on the user endpoint.

The user endpoint may retrieve and display the session information when the communication identity of the enterprise is selected.

The session information may also include context information. The user endpoint preferably stores the context information and displays it if the communication identity of the enterprise is selected.

The user endpoint may include a processor to insert the session identifier into a header of a SIP INVITE request.

The session information further comprises a lifetime value. The user endpoint deletes the session information from the memory once the lifetime value has expired.

In accordance with a third aspect of the present invention there is provided a method performed by a user endpoint. The method includes the step of the user endpoint receiving a message including session information of at least an identifier for a communications session between the user endpoint and an enterprise endpoint. The user endpoint stores, for the communications session, at least the identifier for the communications session in association with a number for the enterprise of the enterprise endpoint.

The method includes the further step of the user endpoint inserting at least the session identifier into a header of a SIP INVITE request requesting a connection to the enterprise of the enterprise endpoint In accordance with a fifth aspect of the present invention there is provided a computer-readable medium having computer-executable instructions. The instructions cause a user endpoint to, upon receiving a message including session information of at least an identifier for a communications session between the user endpoint and an enterprise endpoint, store, for the communications session, at least the identifier for the communications session in association with a number for the enterprise of the enterprise endpoint.

DETAILED DESCRIPTION

To implement the present invention SIP session persistent data, hereinafter referred to as SIPCachedInformation, is generated for a session between a remote endpoint and an enterprise endpoint in an IP telephony network. The SIPCachedInformation includes parameters relating to the session between the two endpoints. These parameters may include, but are not limited to, a unique identifier for the session, a lifetime value specifying the duration that the SIPCachedInformation is valid for, context describing the session the SIPCachedInformation relates to and a callback identifier for the enterprise endpoint.

This information may be exchanged between nodes in the network in any suitable manner. For example, they may be sent as a field in a header of a SIP message. If the call related to a broken computer, the SIP header may be:

SIPCachedInformation: id=121323; lifetime=3600; context="broken computer helpdesk"; callbackId=tel:+46123456

Figure 1:
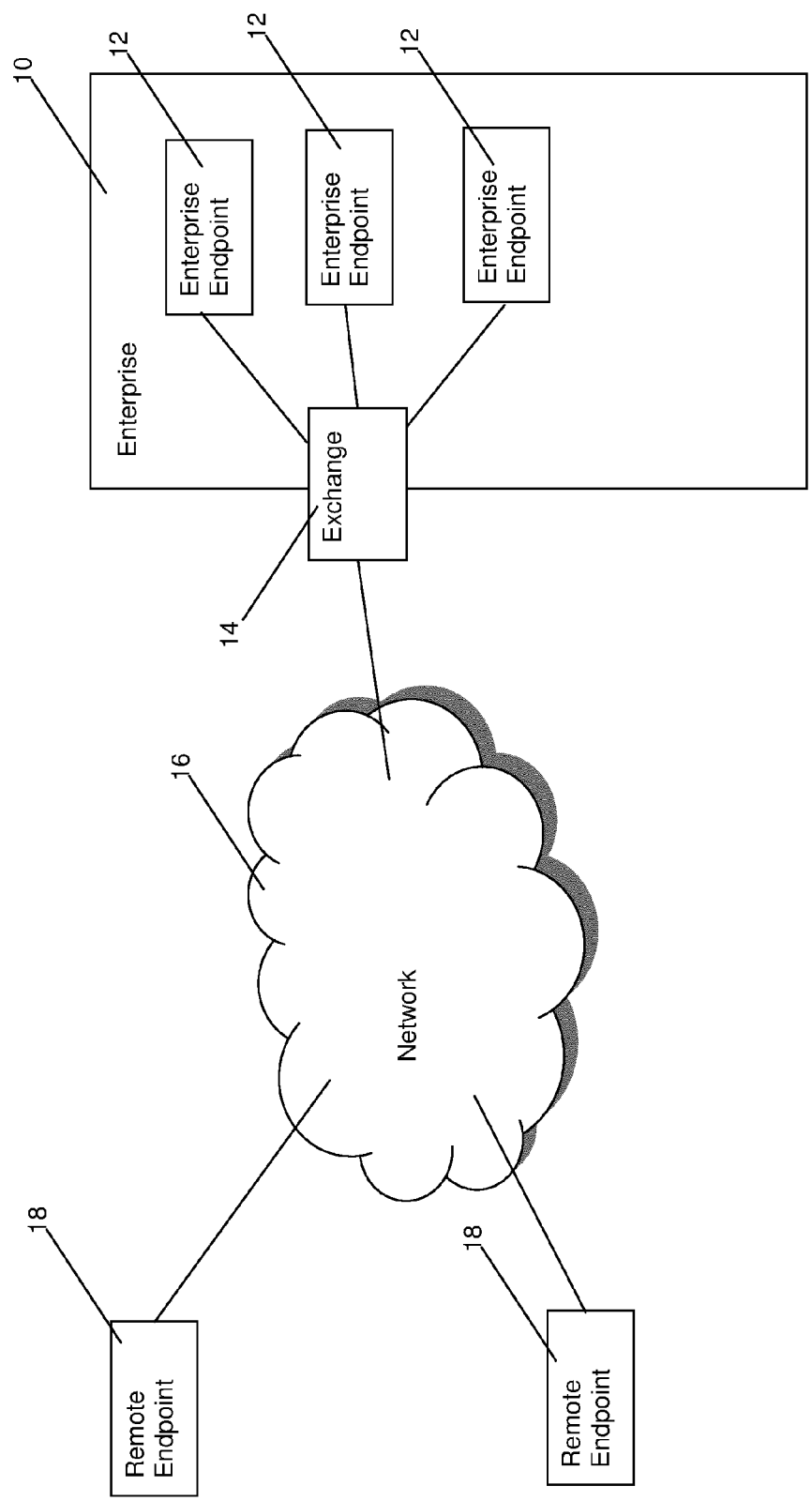
FIG. 1 illustrates an example of a known network including a connection to an enterprise network.
Figure 2:
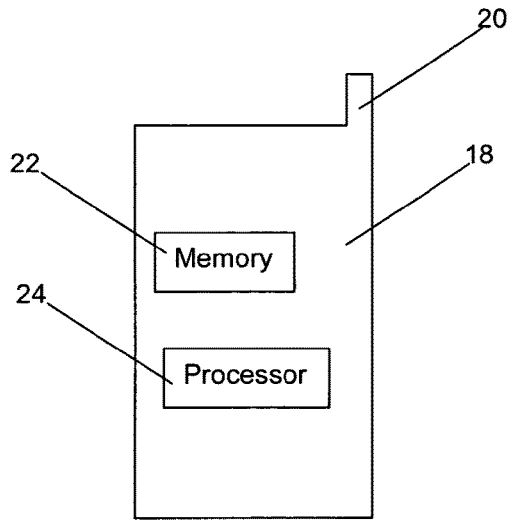
FIG. 2 is an example of a remote endpoint in which the present invention may be implemented.

Alternatively, rather than the parameters being included in a single SIP header as described above they may be included in multiple separate fields in a SIP header as illustrated below:

SIPCachedInformation: id=121323
SIPCachedInformation: lifetime=3600
SIPCachedInformation: context="broken computer helpdesk"
SIPCachedInformation: callbackId=tel:+46123456
SIPCachedInformation: xxx=yyyy FIG. 2 illustrates one method of providing information relating to a session between a remote endpoint and an enterprise endpoint where the enterprise system is registered with an IMS.

When the enterprise is registered with the IMS an initial SIP INVITE message requesting a connection to an enterprise endpoint is first received at the CSCF of the IMS and a connection is set up between an enterprise endpoint and the remote endpoint in accordance with standard methods (following navigation of the menu by the remote endpoint).

Figure 3:
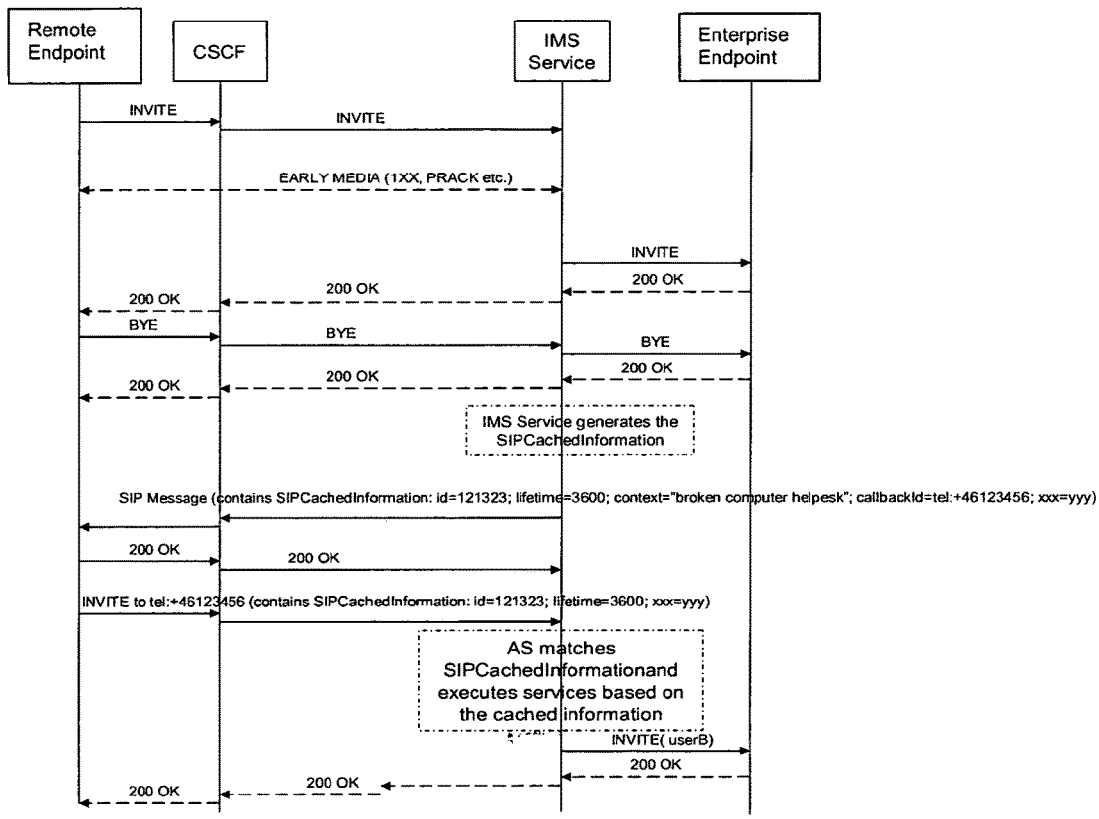
FIG. 3 is a flow diagram of a method of call set up and cached data generation.

In FIG. 3, a remote endpoint such as the one illustrated in FIG. 2, initiates termination of the session with the enterprise endpoint by sending a SIP BYE message which is routed through to the enterprise endpoint which acknowledged with an OK message in accordance with standard procedures.

Upon receipt of the acknowledgement of termination from the enterprise endpoint an application server in the IMS generates and stores the SIPCachedInformation. The application server also causes the SIPCachedInformation to be transmitted to the remote endpoint in a header of a SIP message as described above.

Preferably, the application server includes as the callbackID the Enterprise communication identity this allows the remote endpoint to identify the session that the SIPCachedInformation relates to and associate the SIPCachedInformation with the communication identity of the Enterprise. The remote endpoint therefore associates the SIPCachedInformation with the communication identity of the Enterprise and stores the SIPCachedInformation in a memory.

When the user at the remote endpoint wishes to initiate a follow up session to the initial session they select the Enterprise's communication identity, for example, from a list of previously dialed numbers. The remote endpoint retrieves the SIPCachedInformation associated with the communication identity from its memory and inserts the session identifier into a SIP INVITE message which is sent to the CSCF of the IMS.

The CSCF will detect the presence of the SIPCachedInformation and invoke the application server responsible for processing SIPCachedInformation. The application server will retrieve the SIPCachedInformation associated with the session identifier and use the SIPCachedInformation, such as the enterprise endpoint communication identity, to route SIP call signalling to the appropriate endpoint. A connection between the remote endpoint and enterprise endpoint may be sent in the usual way.

Once the lifetime value of the SIPCachedInformation is reached the remote endpoint and the application server discard the SIPCachedInformation for the session. This means that the session identifier is no longer transmitted by the remote endpoint if the user initiates a communication session with the Enterprise.

FIG. 3 illustrates an alternative embodiment where the application server in the IMS generates and stores the SIPCachedInformation in response to a session being set up between an enterprise endpoint and a remote endpoint. The IMS, for example, may generate the SIPCachedInformation message when it receives an OK message from the receiving user endpoint indicating that the session has been set up between the two user endpoints. SIPCachedInformation may be transmitted to the remote endpoint either when it is generated or at any point during or after the session.

A second session related to the initial session may be set up as described above with reference to FIG. 2.

Figure 4:
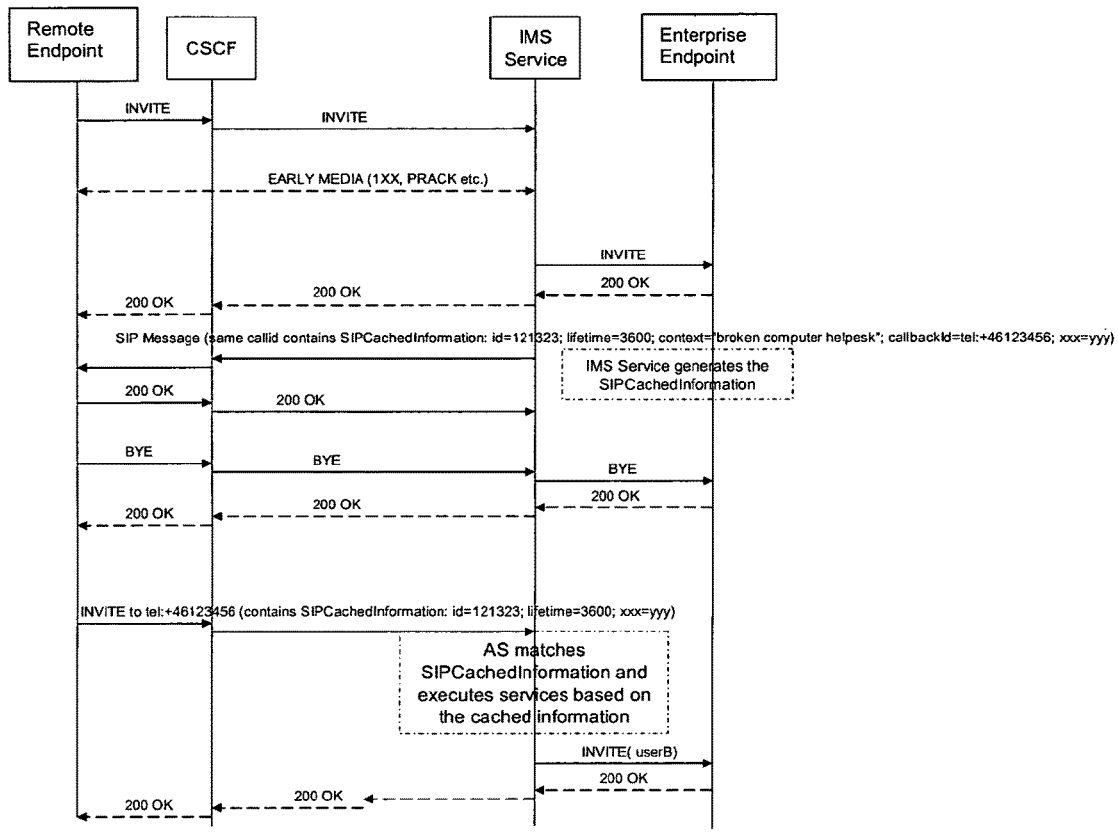
FIG. 4 is a flow diagram of an alternative method of call set up and cached data generation.
Figure 5:
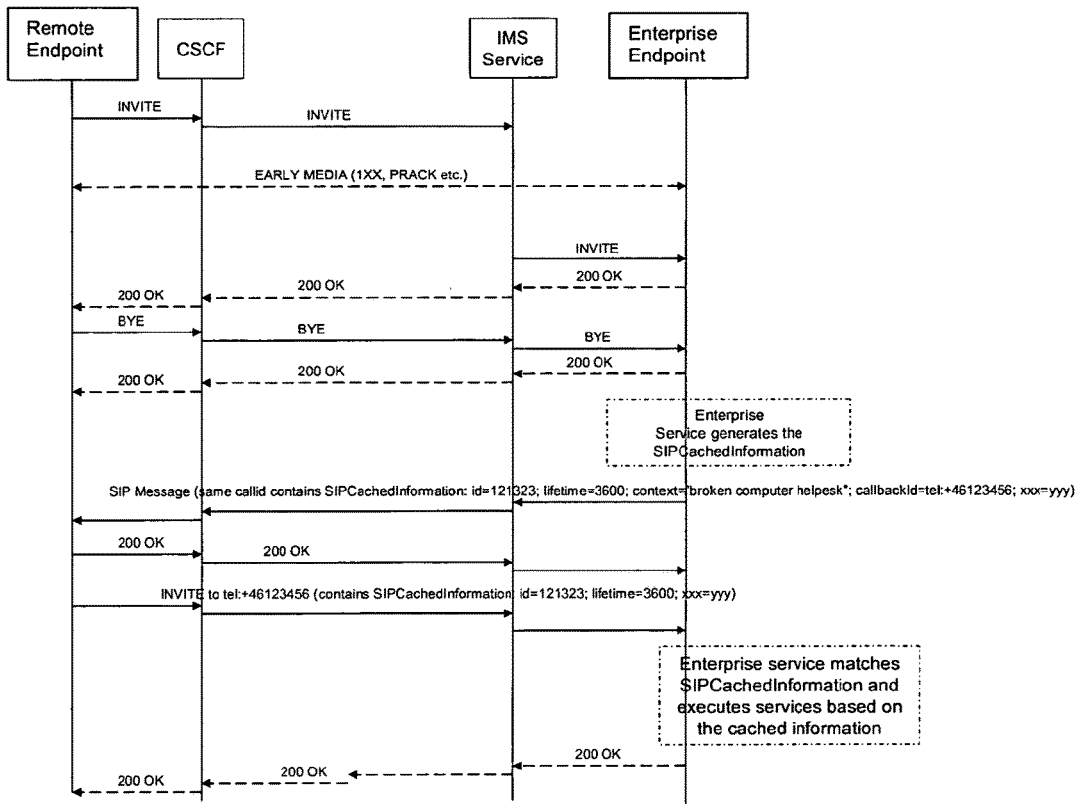
FIG. 5 is a flow diagram of a further method of call set up and cached data generation.

FIG. 4 illustrates an embodiment where a service within the Enterprise system generates the SIPCachedInformation. This service may, for example, be the enterprise endpoint. In FIG. 4 the SIPCachedInformation is generated and transmitted to the remote endpoint in response to termination of a SIP session. As will be understood by the skilled person the Enterprise Service may also generate and transmit SIPCachedInformation in response to call set up or during a session as described with reference to FIG. 3 above.

Although SIPCachedInformation has been described as being generating following a session initiated by a user endpoint outside the Enterprise system it may also be generated following a session initiated by a user endpoint within the Enterprise system. For example, in the case of an unsuccessful session initiated by a user endpoint within the Enterprise system to an endpoint outside the Enterprise system an IMS or Enterprise service may generate SIPCachedInformation and send it to the receiving endpoint as described previously. This SIPCachedInformation may, for example, relate to the Enterprise number in the missed call list at the user endpoint. This means that if a user at the endpoint returns the missed call the IMS or Enterprise service can associate the correct information and route them to the correct place.

As will be understood by the skilled person the SIPCachedInformation may include any suitable parameters. Additionally, the parameters disclosed above are optional. For example, the remote endpoint may not be sent the callbackId of the enterprise endpoint but be sent an SMS message including text equal to the context field of the SIPCachedInformation and a reply to field as the Enterprise or IMS communication identity. When a user at the remote endpoint wishes to initiate a follow up session they may send, from the remote endpoint a SIP request including the session identifier and the application server or enterprise server retrieves the enterprise endpoint's communication endpoint to set up a communication link between the two endpoints.

The context parameter includes text which describes the session between the two endpoints. The context may be automatically generated by the IMS or the enterprise endpoint, for example it may specify the department that the remote endpoint has been in contact with or data extracted from data input into the enterprise endpoint during the session. Alternatively, the context may be manually generated, for example, by the user at the enterprise endpoint on termination of the session.

The callbackID field may depend on the recipient of the SIPCachedInformation. For example in the IMS or the enterprise server the callbackID field will specify the communication identity of the enterprise endpoint/department to which any call including the session identifier is to be connected. However, it is advantageous for the callbackID field sent to the remote endpoint to specify the communication identity of the enterprise in order to enable the remote endpoint to associate the SIPCachedInformation it receives with the communication identity of the enterprise stored in any menus.

Although the SIPCachedInformation is described as being stored both at the user endpoint and within the IMS if the remote endpoint is provided with the callbackId of the enterprise endpoint the SIPCachedInformation need not be stored within the IMS.

Although the SIPCachedInformation has been described as being sent to the user endpoint using an SMS message the skilled person will understand that SIPCachedInformation may be inserted into the header of any other SIP message.

Further a remote endpoint may not associate the SIPCachedInformation with the number of the Enterprise in the dialed numbers list but may store the information in any other suitable manner. For example, SIPCachedInformation received in an SMS message may be stored within the user endpoint's message inbox.

The SIPCachedInformation may be generated or stored in any suitable apparatus or device. For example they may be stored in a server remote from the IMS or the enterprise or co-located with a node in the IMS, a node in the enterprise, or an enterprise gateway.

The invention claimed is:

1. A method, in a communications network including an enterprise endpoint and a remote endpoint, comprising the steps of:
   receiving, by a node in the communications network, information indicating that a communications session between the enterprise endpoint and the remote endpoint is successfully set up or terminated;
   as a result of receiving the information indicating that the communications session between the enterprise endpoint and the remote endpoint is successfully set up or terminated, generating, by the node in the communications network, session information for the communications session between the enterprise endpoint and the remote endpoint, wherein the session information includes: (i) a session identifier for the communications session, (ii) a communication identifier for the enterprise endpoint, (iii) context information, and (iv) a lifetime value;
   storing, by the node in the communications network, the session information;
   transmitting, by the node in the communications network, the session information to the remote endpoint;
   receiving, by the node in the communications network, a session request transmitted by the remote endpoint, wherein the session request includes the session identifier;
   retrieving, by the node in the communications network, the identity of the enterprise endpoint using the session identifier in the session request; and
   setting up, by the node in the communications network, a further communications session between the remote endpoint and the enterprise endpoint using the identity of the enterprise endpoint in the session information,
   wherein the context information enables the further communications session to be a follow-up communications session from the communications session between the enterprise endpoint and the remote endpoint or a new communications session in preference to the follow-up communications session and the lifetime value specifies the duration that the session information is valid for, and
   the session information is discarded and no longer included in another session request when the lifetime value of the session information is reached.

2. The method as claimed in claim 1, further comprising the remote endpoint associating the session identifier with the communication identifier for the enterprise including the enterprise endpoint.

3. The method as claimed in claim 2, wherein the remote endpoint is configured to store the context information and display the context information in response to the communication identity associated with the session information being selected at the remote endpoint.

4. The method as claimed in claim 1, wherein the session information is transmitted to the remote endpoint as an IP based SMS.

5. The method as claimed in claim 1, wherein the received session request transmitted by the remote endpoint is a SIP INVITE request.

6. The method as claimed in claim 1, further comprising the step of transmitting the session information in the header of a SIP message.

7. The method as claimed in claim 1, wherein the node in the communications network is one of a node in an IP telephony network, a node in an IP Multimedia Subsystem and an enterprise gateway.

8. An apparatus in an IP network configured to:
   receive information indicating that a communications session between the enterprise endpoint and the remote endpoint is successfully set up or terminated;
   as a result of receiving the information indicating that the communications session between the enterprise endpoint and the remote endpoint is successfully set up or terminated, generate session information for the communications session between the enterprise endpoint and the remote endpoint, wherein the session information includes: (i) a session identifier for the communications session, (ii) a communication identifier for the enterprise endpoint, (iii) context information, and (iv) a lifetime value;
   store the session information;
   transmit the session information to the remote endpoint;
   receive a session request transmitted by the remote endpoint, wherein the session request includes the session identifier;
   retrieve the identity of the enterprise endpoint using the session identifier in the session request; and
   set up a communications session between the remote endpoint and the enterprise endpoint using the identity of the enterprise endpoint stored in the session information,
   wherein the context information enables the further communications session to be a follow-up communications session from the communications session between the enterprise endpoint and the remote endpoint or a new communications session in preference to the follow-up communications session and the lifetime value specifies the duration that the session information is valid for, and
   the session information is discarded and no longer included in another session request when the lifetime value of the session information is reached.

9. The apparatus as claimed in claim 8, wherein the apparatus is one of a node in an IP Multimedia Subsystem and further configured to transmit session information to the remote endpoint as an IP based SMS.

10. The apparatus as claimed in claim 8, wherein the received session request transmitted by the remote endpoint is a SIP INVITE request.

11. The apparatus as claimed in claim 8, further comprising the step of transmitting the session information in the header of a SIP message.

12. A user endpoint comprising:
a memory; and
a processor coupled to the memory, the processor configured to:
receive a message including session information, wherein
the session information includes: (i) a session identifier for a communications session between the user endpoint and an enterprise endpoint, (ii) a communication identifier for the enterprise endpoint, (iii) context information, and (iv) a lifetime value, and
the communications session between the user endpoint and the enterprise endpoint is successfully set up or terminated;
associate the session information with the communication identifier for the enterprise endpoint; and
store, for the communications session, the session information in association with a number for the enterprise of the enterprise endpoint,
wherein the context information enables a further communications session between the enterprise endpoint and the user endpoint to be a follow-up communications session from the communications session or a new communications session in preference to the follow-up communications session and the lifetime value specifies the duration that the session information is valid for, and
the session information is discarded and no longer included in another session request when the lifetime value of the session information is reached.

13. The user endpoint as claimed in claim 12, wherein the processor is further configured to retrieve and display the session information when the communication identity of the enterprise is selected.

14. The user endpoint as claimed in claim 12, wherein the processor is further configured to store the context information and display the context information in response to the communication identity of the enterprise being selected at the user endpoint.

15. The user endpoint as claimed in claim 12, wherein the processor is further configured to insert the session identifier into a header of a SIP INVITE request.

16. The user endpoint as claimed in claim 12, wherein the processor is further configured to delete the session information from the memory at the end of the lifetime value.

17. A method, in a user endpoint, comprising the steps of:
receiving a message including session information, wherein
the session information includes: (i) a session identifier for a communications session between the user endpoint and an enterprise endpoint, (ii) a communication identifier for the enterprise endpoint, (iii) context information, and (iv) a lifetime value, and
the communications session between the user endpoint and the enterprise endpoint is successfully set up or terminated;
associating the session information with the communication identifier for the enterprise endpoint; and
storing, for the communications session, the session information in association with a number for the enterprise of the enterprise endpoint,
wherein the context information enables a further communications session between the enterprise endpoint and the user endpoint to be a follow-up communications session from the communications session or a new communications session in preference to the follow-up communications session and the lifetime value specifies the duration that the session information is valid for, and
the session information is discarded and no longer included in another session request when the lifetime value of the session information is reached.

18. The method as claimed in claim 17, wherein the method further comprises the steps of storing the context information and displaying the context information in response to the telephone number associated with the session information being selected.

19. The method as claimed in claim 17, further comprising the step of inserting at least the session identifier into a header of a SIP INVITE request requesting a connection to the enterprise of the enterprise endpoint.

20. A non-transitory computer-readable medium having computer executable instructions for causing a user endpoint to:
receiving a message including session information, wherein
the session information includes: (i) a session identifier for a communications session between the user endpoint and an enterprise endpoint, (ii) a communication identifier for the enterprise endpoint, (iii) context information, and (iv) a lifetime value, and
the communications session between the user endpoint and the enterprise endpoint is successfully set up or terminated;
associating the session information with the communication identifier for the enterprise endpoint;
store, for the communications session, the session information in association with a number for the enterprise of the enterprise endpoint,
wherein the context information enables a further communications session between the enterprise endpoint and the user endpoint to be a follow-up communications session from the communications session or a new communications session in preference to the follow-up communications session and the lifetime value specifies the duration that the session information is valid for, and
the session information is discarded and no longer included in another session request when the lifetime value of the session information is reached.

\* \* \* \* \*